United States Patent

Hada et al.

[11] Patent Number: 6,006,010
[45] Date of Patent: *Dec. 21, 1999

[54] DIGITAL IMAGE FORMING APPARATUS

[75] Inventors: Yoshinobu Hada, Aichi-Ken; Kazuyuki Fukui, Toyohashi; Takanobu Yamada, Toyokawa, all of Japan

[73] Assignee: Minolta Co., Ltd., Osaka, Japan

[*] Notice: This patent is subject to a terminal disclaimer.

[21] Appl. No.: 08/977,219

[22] Filed: Nov. 24, 1997

Related U.S. Application Data

[62] Division of application No. 08/365,507, Dec. 28, 1994, Pat. No. 5,729,626.

[30] Foreign Application Priority Data

Dec. 28, 1993 [JP] Japan ............... P05-335168

[51] Int. Cl.[6] .................... G06K 15/00
[52] U.S. Cl. .............. 395/107; 358/401; 358/486; 358/522; 395/109
[58] Field of Search ................... 358/298, 300, 358/475, 462, 455, 456, 501, 401, 522, 520; 382/170, 168, 162, 165; 395/107, 105, 109; 347/253, 247, 130

[56] References Cited

U.S. PATENT DOCUMENTS

| | | | |
|---|---|---|---|
| 4,574,393 | 3/1986 | Blackwell et al. | 382/162 |
| 4,679,057 | 7/1987 | Hamada | 347/252 |
| 5,189,441 | 2/1993 | Fukui et al. | 347/253 |
| 5,255,330 | 10/1993 | Huynh et al. | 382/168 |
| 5,333,038 | 7/1994 | Mizoguchi et al. | 399/46 |
| 5,410,619 | 4/1995 | Fujisawa et al. | 358/447 |
| 5,412,737 | 5/1995 | Govrin | 382/168 |
| 5,414,538 | 5/1995 | Eschbach | 358/522 |
| 5,420,614 | 5/1995 | Fukui et al. | 347/130 |
| 5,438,437 | 8/1995 | Mizoguchi et al. | 358/518 |
| 5,467,196 | 11/1995 | Fukushima et al. | 358/298 |
| 5,729,626 | 3/1998 | Hada et al. | 358/298 |

*Primary Examiner*—Edward L. Coles
*Assistant Examiner*—Cheukfan Lee
*Attorney, Agent, or Firm*—Sidley & Austin

[57] ABSTRACT

In a digital image forming apparatus, a document image is read as digital data, and an image type of bi-level image or multi-level image is discriminated from the digital data. For a bi-level image, an intensity of laser beam for exposing a photoconductor is modulated according to the image data with a duty ratio of 100%. On the other hand, for a multi-level image such as a photograph image, the intensity of laser beam is modulated with a duty ratio in the unit of two or more dots according to the image data. The duty ratio and the laser output power are changed according to a type or document image or according to sensitivity characteristic of the photoconductor.

21 Claims, 14 Drawing Sheets

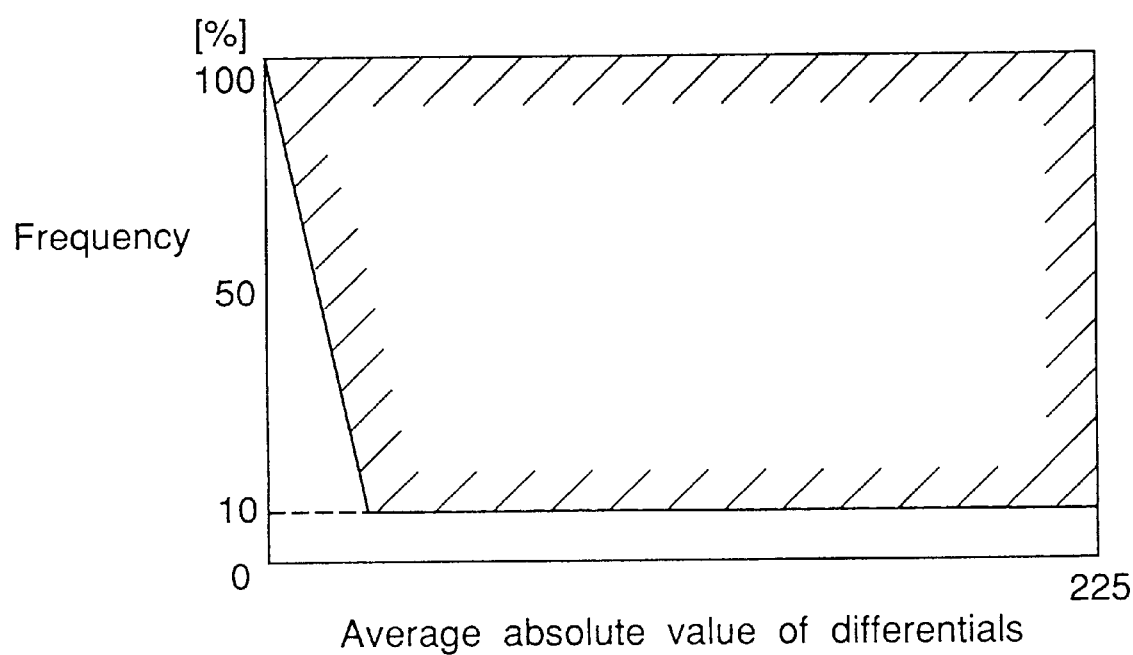

DIGITAL IMAGE FORMING APPARATUS

RELATED APPLICATION

This is a divisional of allowed application Ser. No. 08/365,507, filed Dec. 28, 1994, now U.S. Pat. No. 5,729,626.

BACKGROUND OF THE INVENTION

1. Field of the Invention

The present invention relates to a digital image forming apparatus such as a digital printer or a digital copying machine which expresses gradation by modulating light intensity.

2. Description of the Prior Art

In a digital image forming apparatus such as a digital printer or a digital copying machine which forms an image by modulating a light intensity of a laser beam, a photoconductor is exposed in raster scan with a laser beam at an intensity modulated according to image data of a document read by an image reader. In the raster scan, the photoconductor is exposed during a time in correspondence to a length of one dot. Thus, each dot is formed in correspondence to an amplitude of image density data, and an electrostatic latent image is formed on the photoconductor.

The modulation of laser intensity can form an image with a high resolution, while it can form an image with smooth gradation characteristic. However, this method has a disadvantage in that pit noises along the subscan direction is liable to occur to deteriorate image quality. Further, gradation correction needed to correct the nonlinear gradation characteristic between image density on a document and output image density on a paper is affected by environment conditions and the like. Especially for a color image forming apparatus, image quality and gradation correction are important because a document including a color photograph is reproduced usually.

In order to solve the problems, U.S. patent application Ser. No. 07/971,055, now U.S. Pat. No. 5,420,614 discloses that an interval is provided between light emitting periods or the laser beam irradiates the photoconductor intermittently. By providing such intervals, the above-mentioned pitch noises do not become noticeable and this improves the smoothness of an image. Further, the nonlinearity of gradation characteristic which also affects image quality is also improved, and the image can be reproduced more stably. A duty ratio, defined as a ratio of a light-emitting period to a sum of the light-emitting period and a non-light-emitting period, can be changed. It is also disclosed that the above-mentioned interval is provided in the unit of a plurality of dots, say two dots.

Though the introduction of duty ratio improves the image quality and gradation characteristic as mentioned above, the image quality also depends on a kind of image such as a photograph image, and gradation characteristic is affected by environment such as humidity. Therefore, it is desirable that an image quality is improved more by taking them into account.

SUMMARY OF THE INVENTION

An object of the present invention is to provide an digital image forming apparatus which forms an image of good image quality.

Another object of the present invention is to provide an digital image forming apparatus which reproduces an image with a more linear gradation characteristic.

In one aspect of a digital image forming apparatus, a surface of a photoconductor is scanned to be exposed with a beam in raster scan so as to form an electrostatic latent image thereon, and an intensity of the beam is controlled in accordance to image data detected on a document. In the exposure, it is inhibited to expose the photoconductor every predetermined period, so that a time interval is formed between light-emitting periods. On the other hand, a type of an image such as a character image or a photograph image is discriminated, and a ratio of the light-emitting period to the interval (or a duty ratio defined as a ratio of a light-emitting period to a sum of the light-emitting period and a non-light-emitting period) is changed in accordance to the discriminated type. The type may be discriminated in various portions of a document. In the exposure, an interval may be provided in the unit of a plurality of dots. Preferably, the intensity of the beam is also changed according to the ratio. A plurality of combinations of the number of dots and the ratio may be determined for various image types. The ratio may be changed according to the sensitivity of the photoconductor which is affected for example by humidity.

An advantage of the present invention is that an image can be reproduced with good image quality.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 10A and 10B are diagrams of differential filters;

FIG. 11 is a graph of a distribution of differentials (absolute values) for image discrimination;

DETAILED DESCRIPTION OF THE PREFERRED EMBODIMENTS

Figure 1:
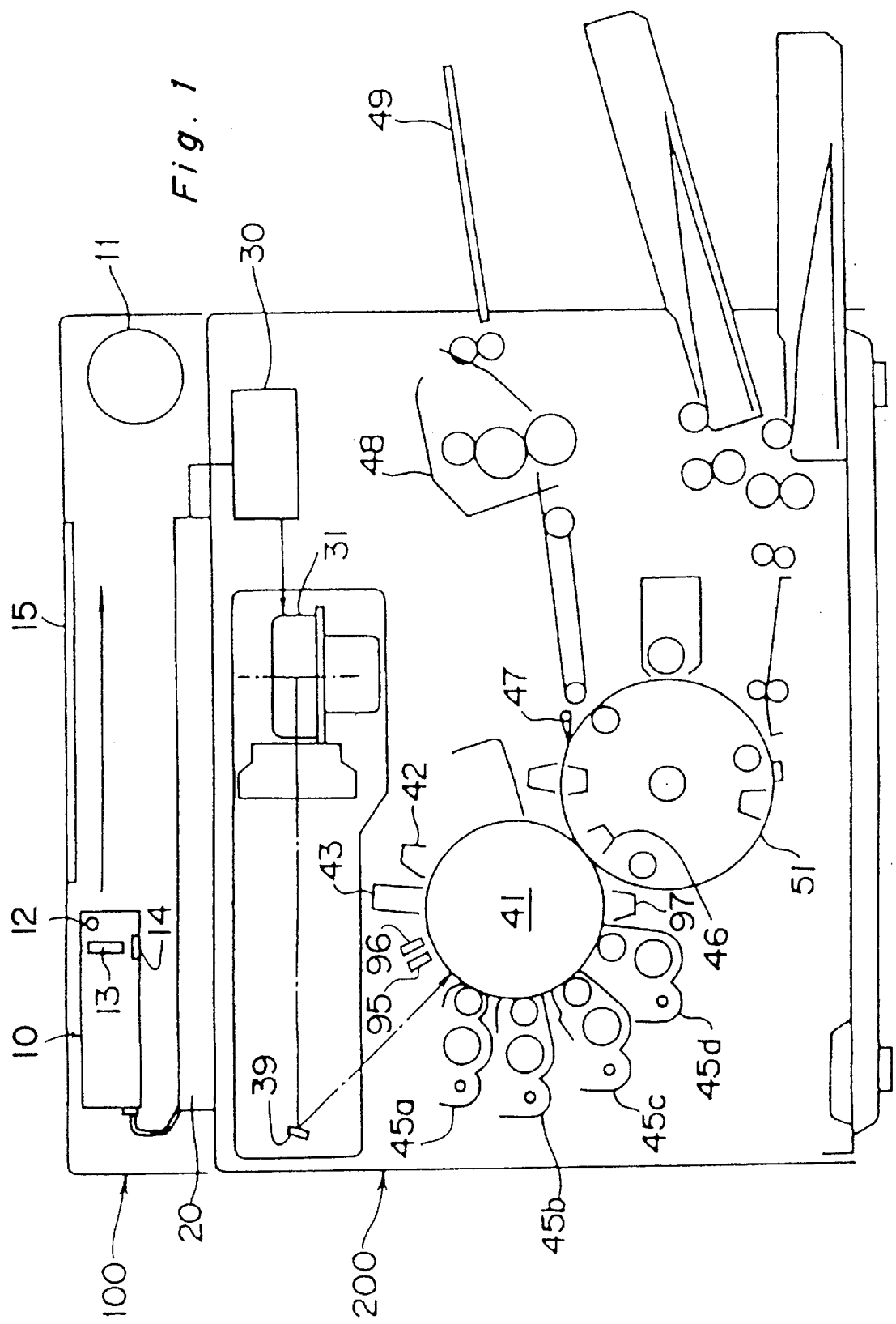
FIG. 1 is a schematic view of a digital color copying machine.

Referring now to the drawings, wherein like reference characters designate like or corresponding parts throughout the several views, a digital copying machine of an embodiment of the invention is explained below which forms an image on a photoconductor by modulating light intensity of a laser beam in raster scan to form an electrostatic latent image on the photoconductor. In the laster scan, the photoconductor is exposed during a predetermined period of time in correspondence to one or more pixels. Thus, a dot is formed in correspondence to an intensity of image density data. An appropriate duty ratio, defined as a ratio of a light-emitting period to a sum of the light-emitting period and a non-light-emitting period, is set according to density level of document image.

FIG. 1 shows the digital color copying machine schematically, and it consists of an image reader 100 and a printer 200 for reproducing an image read by the image reader 100. In the image reader 100, a scanner 10 has an exposure lamp 12 for illuminating a document placed on a platen 15, a rod lens array 13 for collecting light reflected from the document, and a CCD color image sensor 14 for converting the collected light to an electric signal. When the document is read, the scanner is driven by a motor 11 to move along a direction shown with an arrow to scan an image on the document. An image on the document illuminated by the exposure lamp 12 is converted by the image sensor 14 to electric signals of red, green and blue. A read signal processor 20 processes the electric signals to generate 8-bit gradation data of yellow, magenta, cyan or black, while it also make a histogram on the gradation data to discriminate image type of bi-level image or multi-level image in the unit of a processing block, as will be explained later.

In the printer 200, a control unit 30 receives 8-bit gradation data and discrimination signals from the read signal processor 20, and it corrects the gradation data according to gradation correction characteristic based on various data from sensors and supplies drive signals to a print head 31 for modulating a laser beam by using the duty ratio and the standard laser output power determined according to the discrimination signal and the environment factor such as humidity or temperature, as will be explained later. A rotatable photoconductor drum 41 is illuminated by an eraser lamp 42 and is charged uniformly by a sensitizing charger 43 before each copy operation. A laser beam emitted by the print head 31 is reflected by a mirror 39 to expose the photoconductor drum 41 to form an electrostatic latent image. One of developing units 45a, 45b, 45c and 45d for cyan, magenta, yellow and black is selected to develop the latent image to form a toner image. The toner image is transferred by a transfer charger 46 onto a paper on a transfer drum 51. This scan and print process is repeated four times for the four colors. Then, the paper is separated by operating a claw 47 and fixed by a fixing unit 48 to be discharged onto a tray 49.

Figure 2:
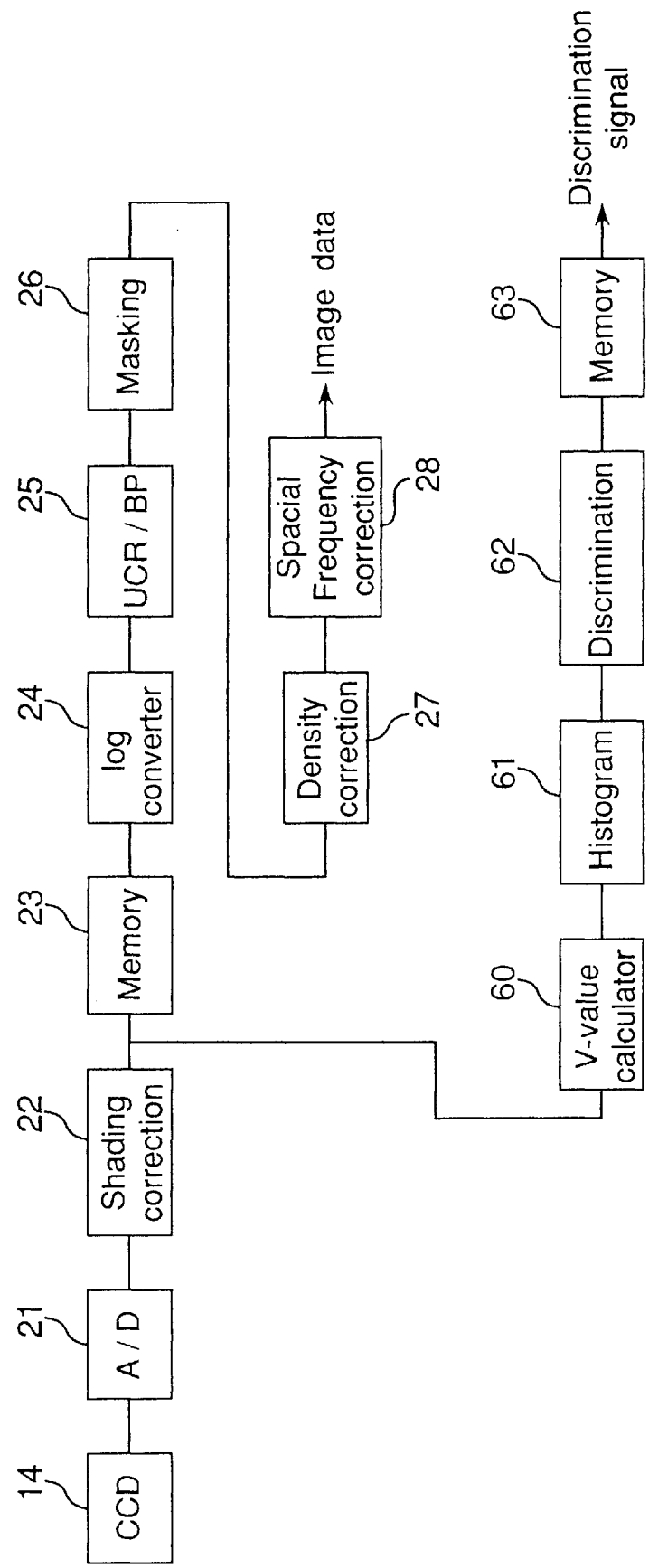
FIG. 2 is a block diagram of image data processor.

FIG. 2 shows a block diagram of the image processor 20. Electric signals of a document image received from the CCD sensor 14 is converted by an A/D converter 21 to digital multi-level (8-bit) values of red, green and blue. The digital value is corrected by shading correction circuit 22 for shading correction, and the corrected value is stored in a memory 23.

Data stored in the memory 23 represent an intensity of light reflected from the document, and they are converted by a log converter 24 to density data. Next, an undercolor-remove/black-paint circuit 25 removes a black component from the data of red, green and blue and generates black data. The resultant data of red, green and blue are converted by a masking circuit to density data of cyan, magenta or yellow, and the density data is multiplied with a coefficient for correction by a density correction circuit 27. Then, the density data is corrected on spatial frequency by a spacial frequency correction circuit 28 and sent to the control unit 30.

On the other hand, the data after shading correction is also sent to a V-value calculator 60 which calculates a brightness V for each pixel. (Usually, brightness is represented as Y, but it is represented as V in this specification.) A histogram circuit 61 makes a histogram of brightness V in the unit of a processing block made of a prescribed pixel matrix, as will be explained later in detail. A decision circuit decides a document type according to the histogram generated by the histogram circuit 61. A decision result is once stored in a memory 63, and it is also sent to the control unit 30.

Figure 3:
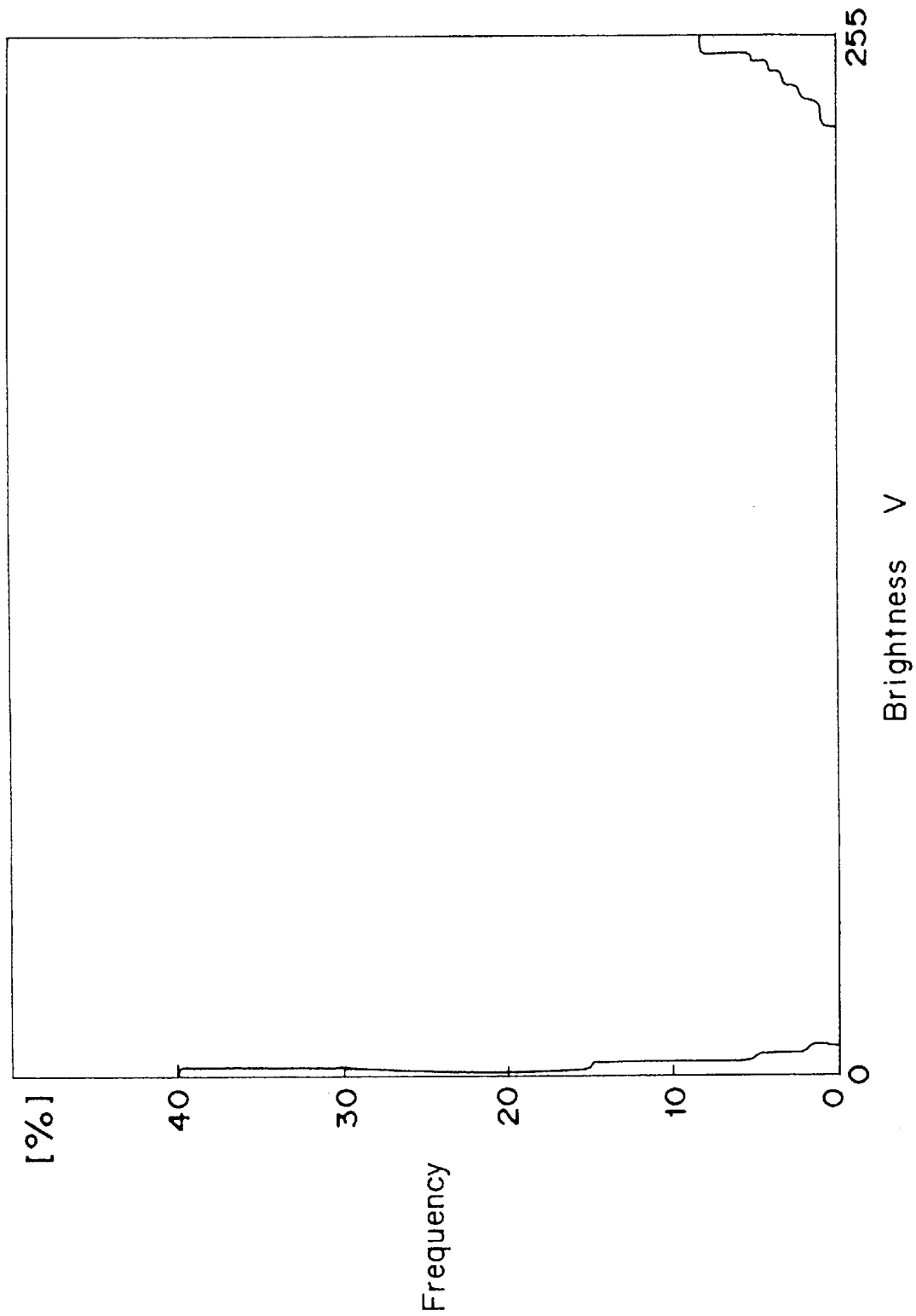
FIG. 3 is a histogram of brightness V of pixels in a processing block of 100*100 pixels for a character image.
Figure 4:
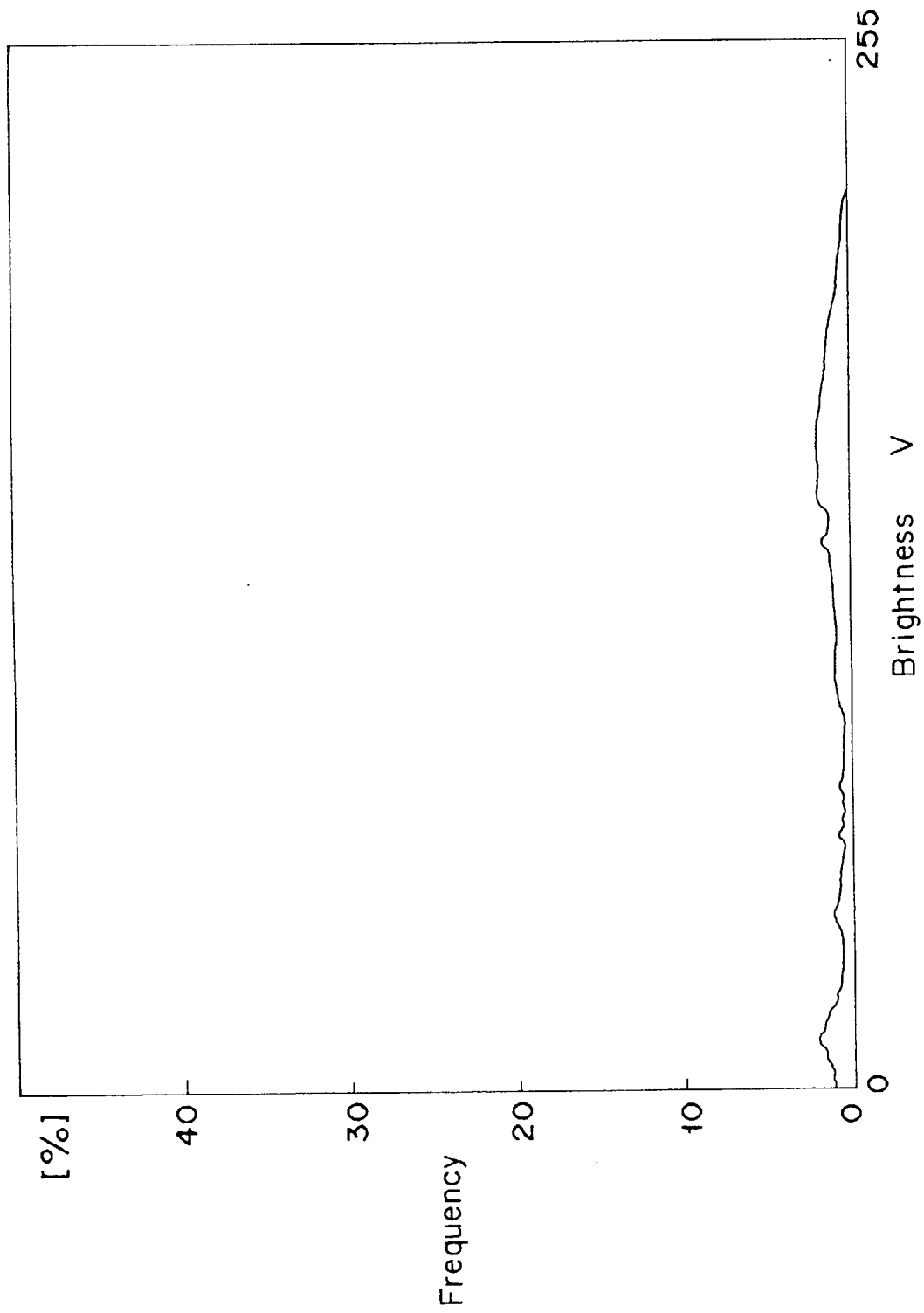
FIG. 4 is a histogram of brightness v of pixels in a processing block of 100*100 pixels for a photograph image.

Next, discrimination of image type of bi-level image or multi-level image by the image processor 20 is explained. A bi-level image is an image such as a character image which consists mainly of black and white levels. On the other hand, a multi-level image is an image which includes various density levels and it includes a photograph image. FIG. 3 shows an example of a histogram of brightness V obtained by the V-value calculator 60 of pixels in a processing block of 100*100 pixels for a character image. Because a character image is a bi-level image, the frequency is high only near zero and near a maximum level. On the other hand, FIG. 4 shows an example of a histogram of brightness V of pixels in a processing block of 100*100 pixels for a photograph image. Because a photograph image is a multi-level image, the frequency scatters over a wide range. It is clear that a histogram for a photograph image is different clearly from that for a character image, and the discrimination circuit 62 decides the document type such as character image or photograph image by discriminating features of a histogram. That is, if a histogram of an image is included in a hatched region shown in FIG. 5, the image is decided as a character image. The hatched area does not exist at intermediate brightness V.

Figure 6:
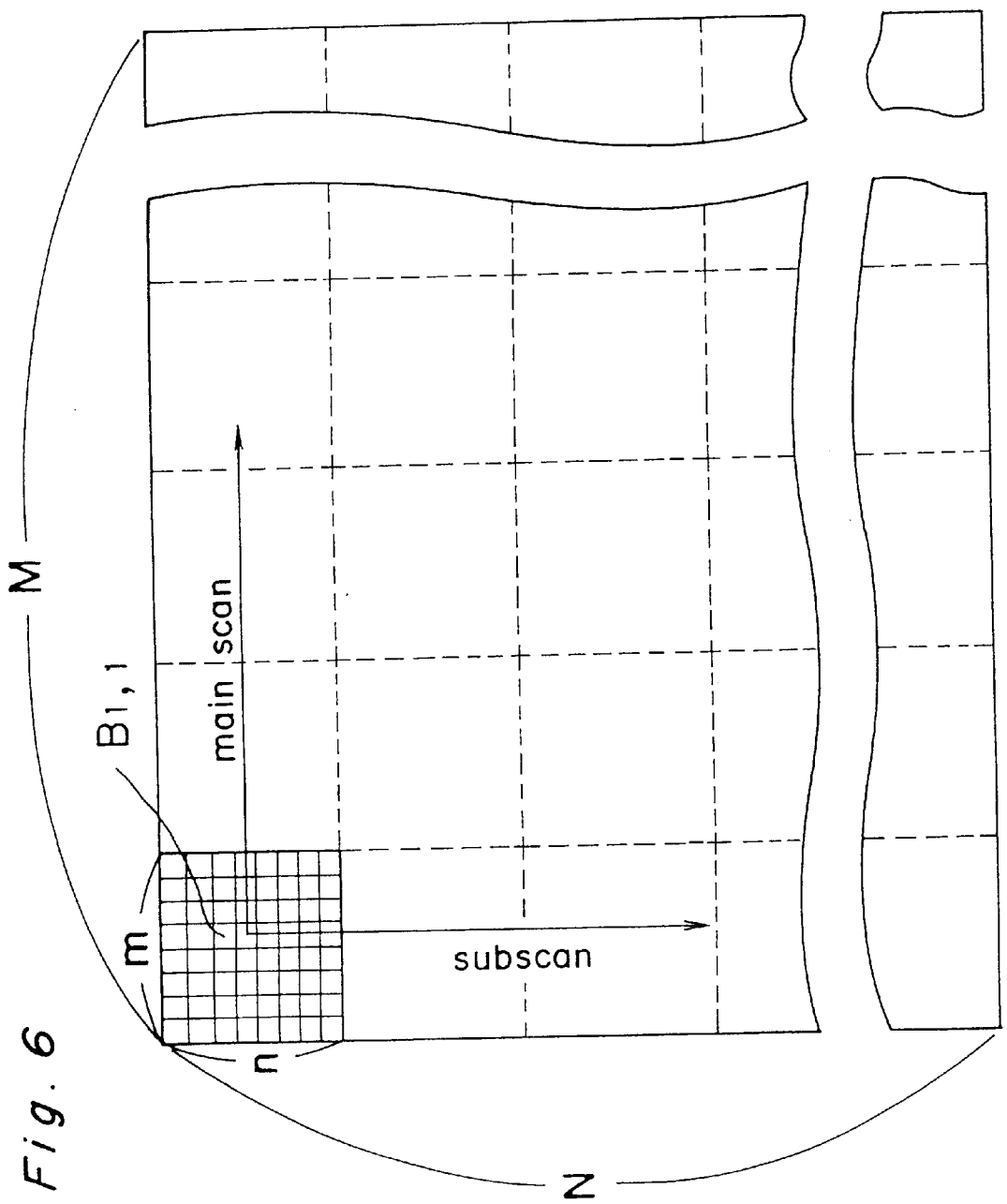
FIG. 6 is a diagram for illustrating a digital image data of M*N pixels with reference to a processing block $B_{X,Y}$ of m*n pixels.

Next, image discrimination using a histogram by the histogram circuit 61 and the discrimination circuit 62 is explained. As shown in FIG. 6, digital image data of M*N pixels are divided into processing blocks $B_{X,Y}$ each consisting of m*n pixels, where m and n are divisors of M and N. Therefore, (M/m)*(N/n) processing blocks are included in the image. A frequency of brightness V=i (=1–255) in a processing block $B_{X,Y}$ is denoted as Z(X, Y, i).

Figure 7:
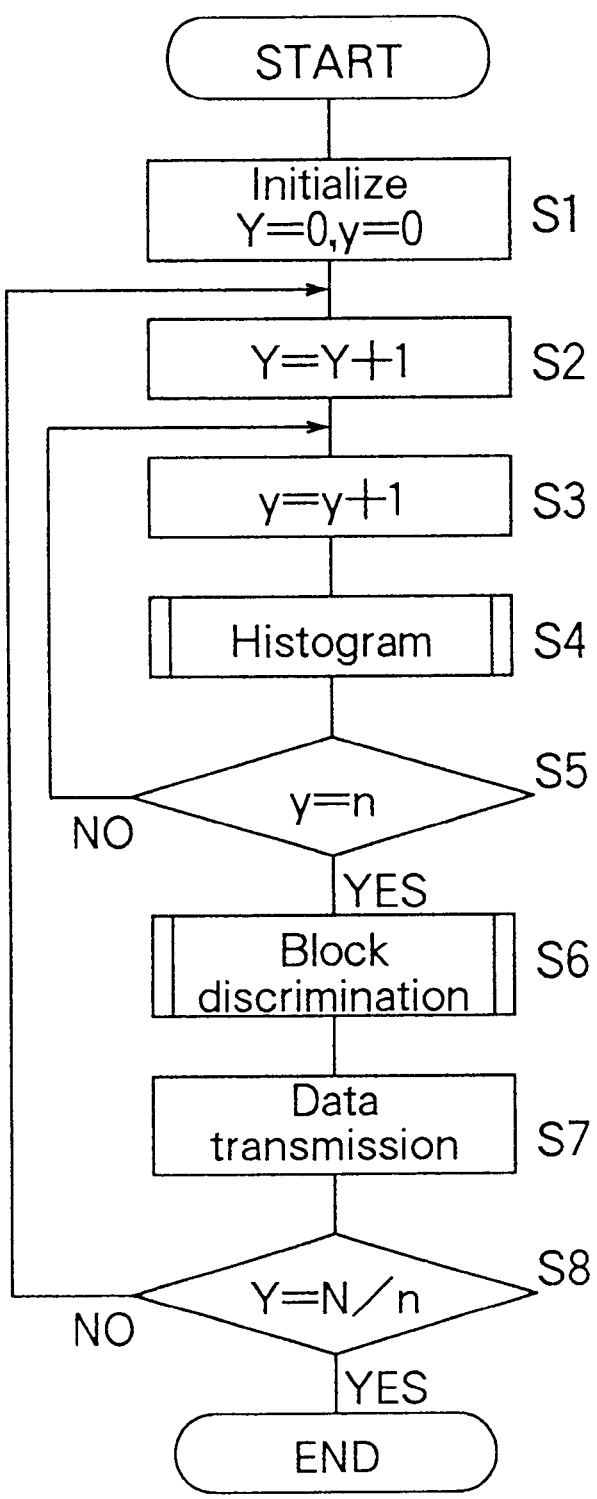
FIG. 7 is a flowchart of image discrimination.

FIG. 7 shows a main flow of image discrimination. First, variables are initialized (step S1), or i, Y and y are set as zero. In this flow, x denotes an x-th pixel along main scan direction while y denotes an y-th pixel along subscan direction in a processing block $B_{X,Y}$ (refer to FIG. 6). Next, Y is set by increasing it by 1 (step S2). Next, histograms of processing blocks $B_{1,Y}$ to $B_{M/m,Y}$ are calculated. That is, y is set by increasing it by 1 (step S3), and histograms of processing blocks $B_{X,Y}$ (X=1–M/m) are calculated as will be explained later (step S4, refer FIG. 8). The flow returns to step S3 if y is decided not to be equal to n or a number of dots along subscan direction (NO at step S5). This calculation is repeated until y is decided to be equal to n (YES at step S5).

Then, it is discriminated if images in the processing blocks $B_{1,Y}$ to $B_{M/m,Y}$ are a bi-level image or a multi-level image (step S6, refer FIG. 9), and discrimination signals S for the processing blocks are sent to the memory 63.

Then, the flow returns to step S2 for other processing blocks if Y is decided not to be equal to N/n (No at step S8), and this calculation is repeated until Y is decided to be equal to N/n (YES at step S8) or calculation on all processing blocks is completed.

Figure 8:
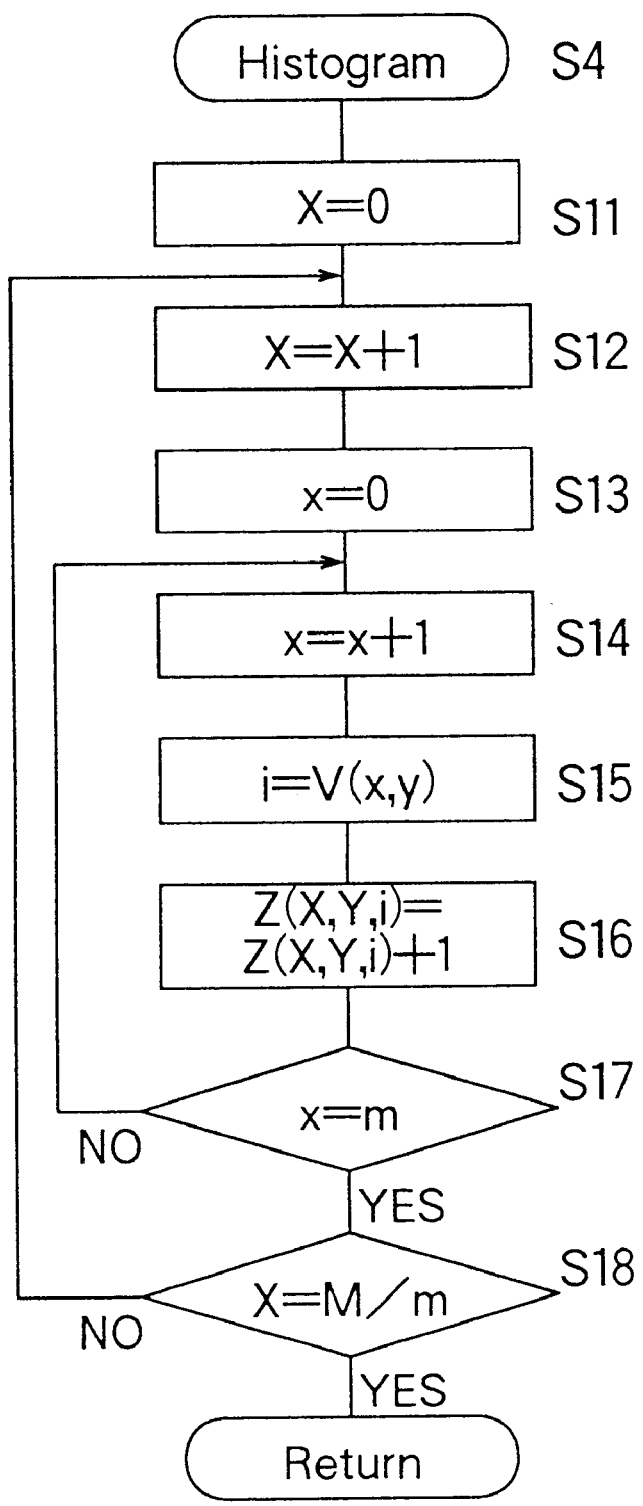
FIG. 8 is a flowchart of histogram processing.

FIG. 8 shows a flow of histogram processing (step S4 in FIG. 7) for making histograms of processing blocks $B_{X,Y}$ (X=1−M/m). First, X is set as zero for initialization (step S11). Next, X is set by increasing it by 1 (step S12). Then, x is set as zero for initialization (step S13). Next, a histogram of a processing block $B_{X,Y}$ in y-th line is calculated. That is, x is set by increasing it by 1 (step S14), while a V value for a pixel at a position (x, y) is set as i (step S15). Then, a frequency Z(X,Y,i) of brightness i in the processing block $B_{X,Y}$ is increased by one (step S16). Then, the flow returns to step S14 if x is decided not to be equal to m (NO at step S17), and this calculation is repeated until x is decided to be equal to m (YES at step S17) or until the calculation of the histogram in the processing block $B_{X,Y}$ is completed.

If the histogram in the processing block $B_{X,Y}$ is completed (YES at step S18), it is decided next if X is equal to M/m (step S18). The flow returns to step S12 if X is decided not to be equal to M/m (NO at step S18), and this calculation is repeated for another processing block until X is decided to be equal to M/m (YES at step S18) or until she calculation of the histograms for the processing blocks $B_{X,Y}$ (X=1−M/m) are completed.

Figure 5:
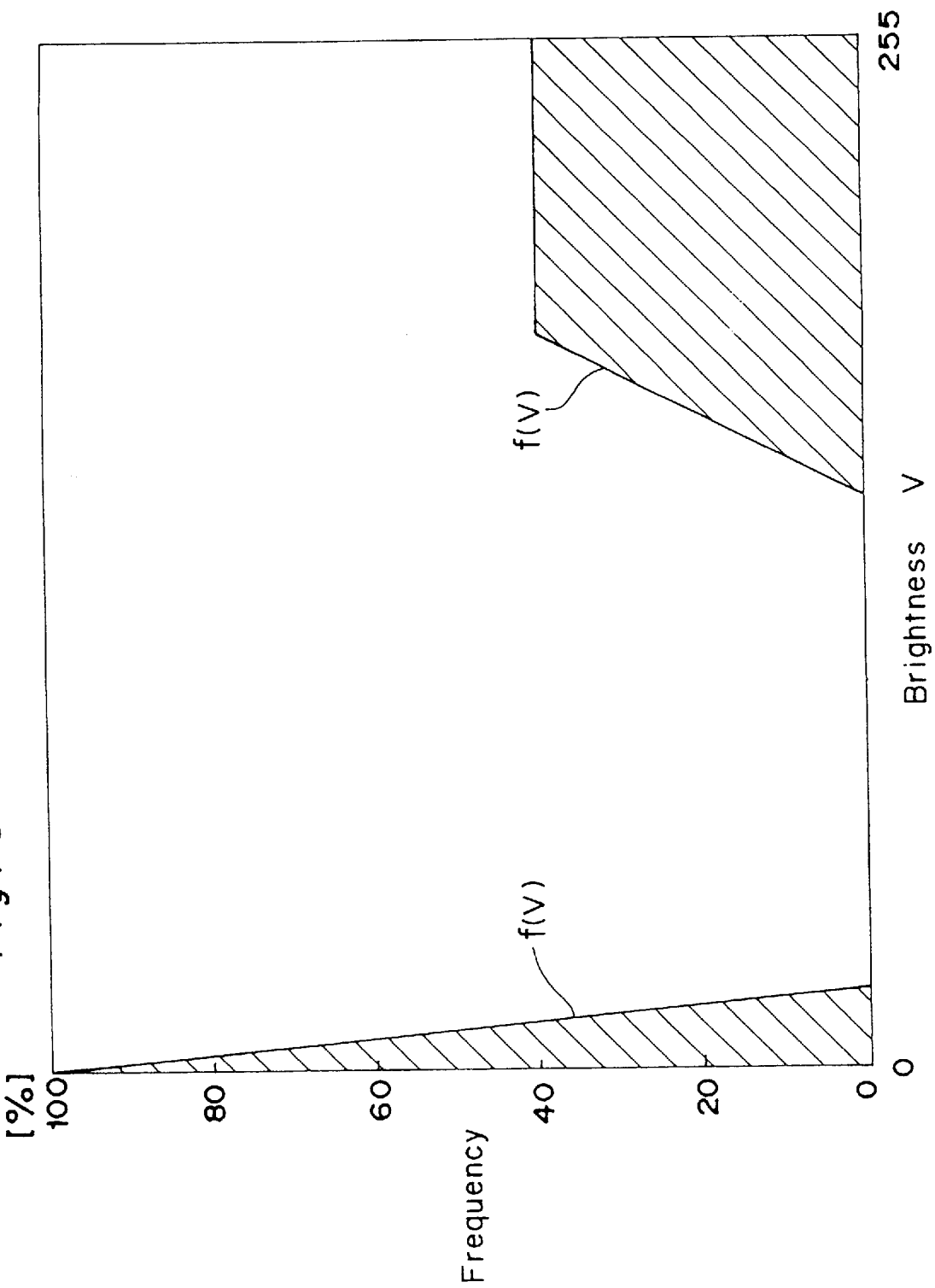
FIG. 5 is a histogram for discriminating a character image.
Figure 9:
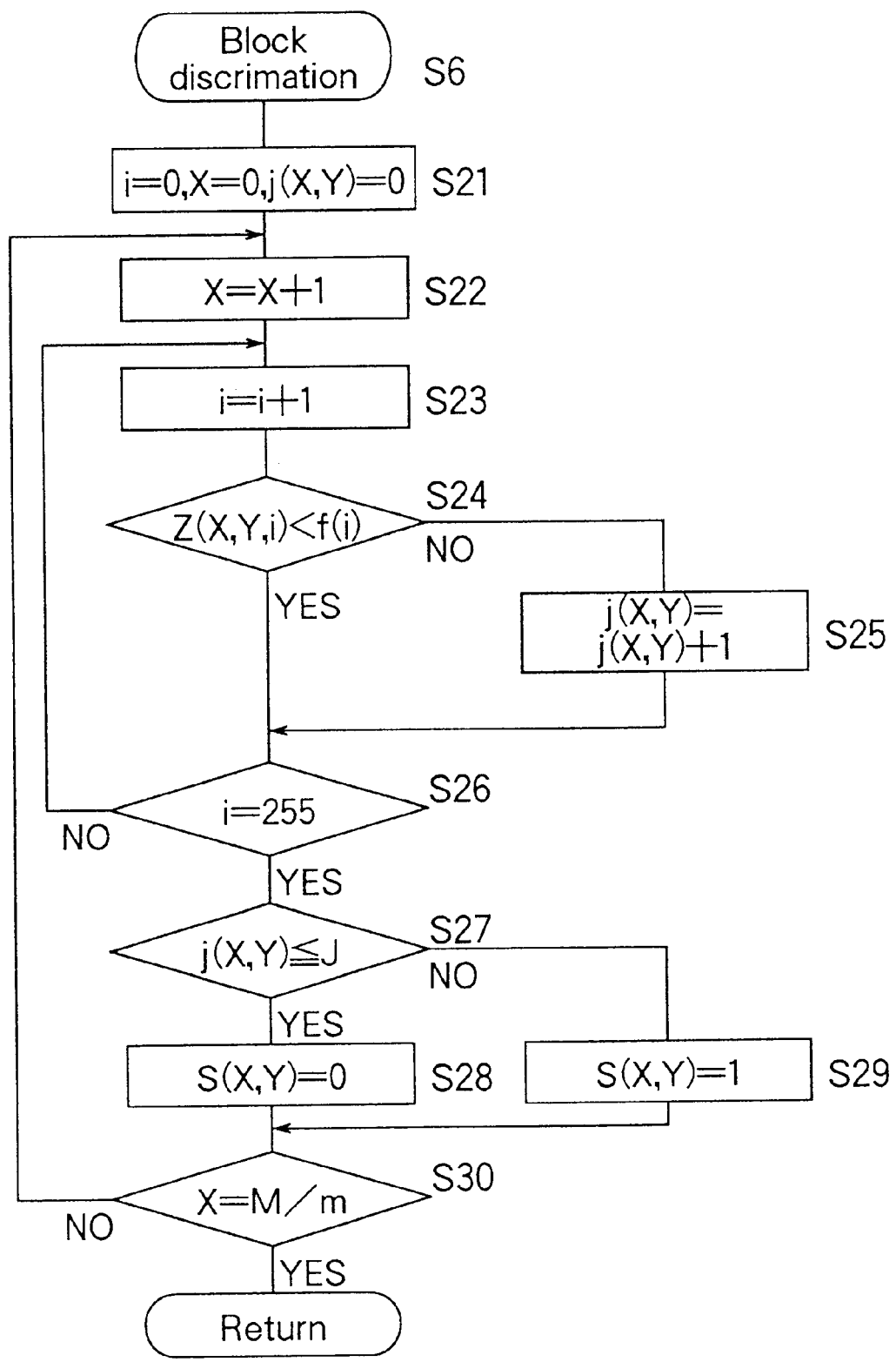
FIG. 9 is a flowchart of block discrimination processing.

FIG. 9 shows a flow of block discrimination processing (step S6 in FIG. 7) for supplying discrimination signals S which show that images in the processing blocks $B_{1,Y\ to\ BM/m,Y}$ are a bi-level image or a multi-level image. First, variables are initialized (step S21), or i, X and a coefficient j(X,Y) are set as zero. Next, X is set by increasing it by 1 (step S22). Next, the coefficient j(X,Y) is calculated. That is, i is set first by increasing it by one (step S23), and if the frequency Z(X,Y,i) is not smaller than a reference value f(i) (YES at step S24), the coefficient j(X,Y) is increased by one (step S25). The reference values f(i) are shown in FIG. 5 as a boundary of the hatched area. The flow returns to step S23 if j is decided not to be equal to 255 (NO at step S26). In other words, this calculation is repeated until j becomes 255 (YES at step S26) or coefficients for all i is determined.

Then, a discrimination signal S(X,Y) for the processing block $B_{X,Y}$ is determined. That is, if the coefficient j(X,Y) is equal to or less than a threshold value J (YES at step S27), a discrimination signal S(X,Y) is set as zero (step S27) or the image in the block is discriminated as a bi-level image, otherwise it is set as one (step S28) or the image in the block is discriminated as a multi-level image.

Then, the flow returns to step S22 if X is decided not to be equal to M/m (NO at step S30) for other processing blocks, and this calculation is repeated until X is decided to be equal to M/m (YES at step S30) or until the discrimination signals S(X,Y) on all the processing blocks $B_{1,Y}$–$B_{M/m,Y}$ are obtained.

The discrimination of image type is not limited to the procedure explained above. For example, the brightness data or the density data may be processed with a differential filter and the image type may be discriminated according to the distribution of the obtained differential values. FIGS. 10A and 10B show examples of differential filters for detecting an edge of an image along main scan direction and along a subscan direction, respectively. Both filters may be used for discriminating the image type. In this case, an average of a sum of the absolute values of differential values obtained with use of the two filters is used for the discrimination. For example, as shown in FIG. 11, if an average of differentials (absolute values) exists within a hatched area, the image is discriminated as a bi-level image, otherwise it is discriminated as a multi-level image. This discrimination is based on a fact that a bi-level image has a peak in the hatched area exceeding a threshold level say 10% in the hatched area in FIG. 11 except near zero.

Figure 12:
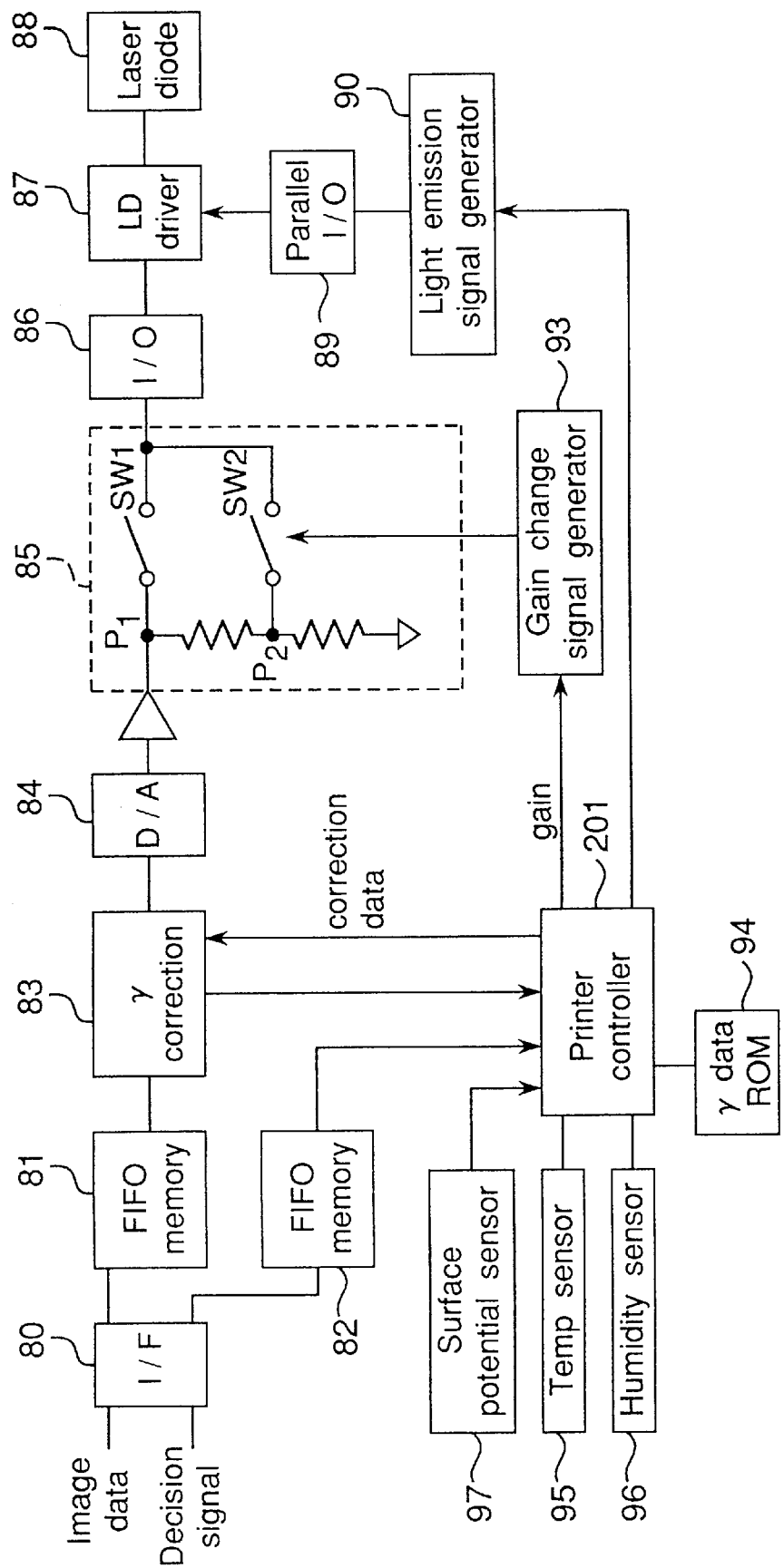
FIG. 12 is a block diagram of a print head.

FIG. 12 shows a block diagram of the control unit 30. The 8-bit image data are received from the image signal processor 20 by the interface 80 to be stored in a first-in first-out (FIFO) memory 81. The discrimination signals S are stored in another first-in first-out memory 82. A printer controller 201 reads an appropriate gamma correction table from the gamma data ROM 94 according to the measured values of a temperature sensor 95, a humidity sensor 96, a surface potential sensor 97, and other sensors such as AIDC sensor not shown explicitly. Then, it sends the gamma correction table to a gamma correction section 83 and a standard laser output power in correspondence to the selected gamma correction table to the gain change signal generator 93. The gamma correction section 83 corrects the gradation data read from the FIFO memory 81 by using the gamma correction table. If the discrimination signal is zero or the image type is photograph image, the gamma correction section 83 processes the correction in the unit of two pixels. That is, the density level data of two neighboring pixels are averaged, and the gradation correction is performed on the average. On the other hand, if the image type is bi-level image, the light-emitting period is set as one dot. The corrected gradation data is sent to a D/A converter 84. The D/A converter 84 converts the corrected gradation data to an analog voltage, which is amplified by an amplifier 85 according to a gain or output power set by the change signal generator 93 by using switches SW1, SW2 and the like. The gain of the amplifier 85 is determined by the printer controller 201 according to the discrimination signal received from the FIFO memory 82 and measured values of the humidity sensor 96 and the temperature sensor 95 and sent to the gain change signal generator 93. The amplified analog voltage is sent through a drive I/O circuit 86 to a driver 87 for a laser diode 88 which emits a light at an intensity modulated according to image data. On the other hand, the light emission signal generator 90 sets a duty ratio for the density level according to the duty ratio received from the printer controller 201. That is, the light emission signal generator 90 sends a light emission signal only in a light emission period through a parallel I/O 89 to the laser diode driver 87.

Figure 13:
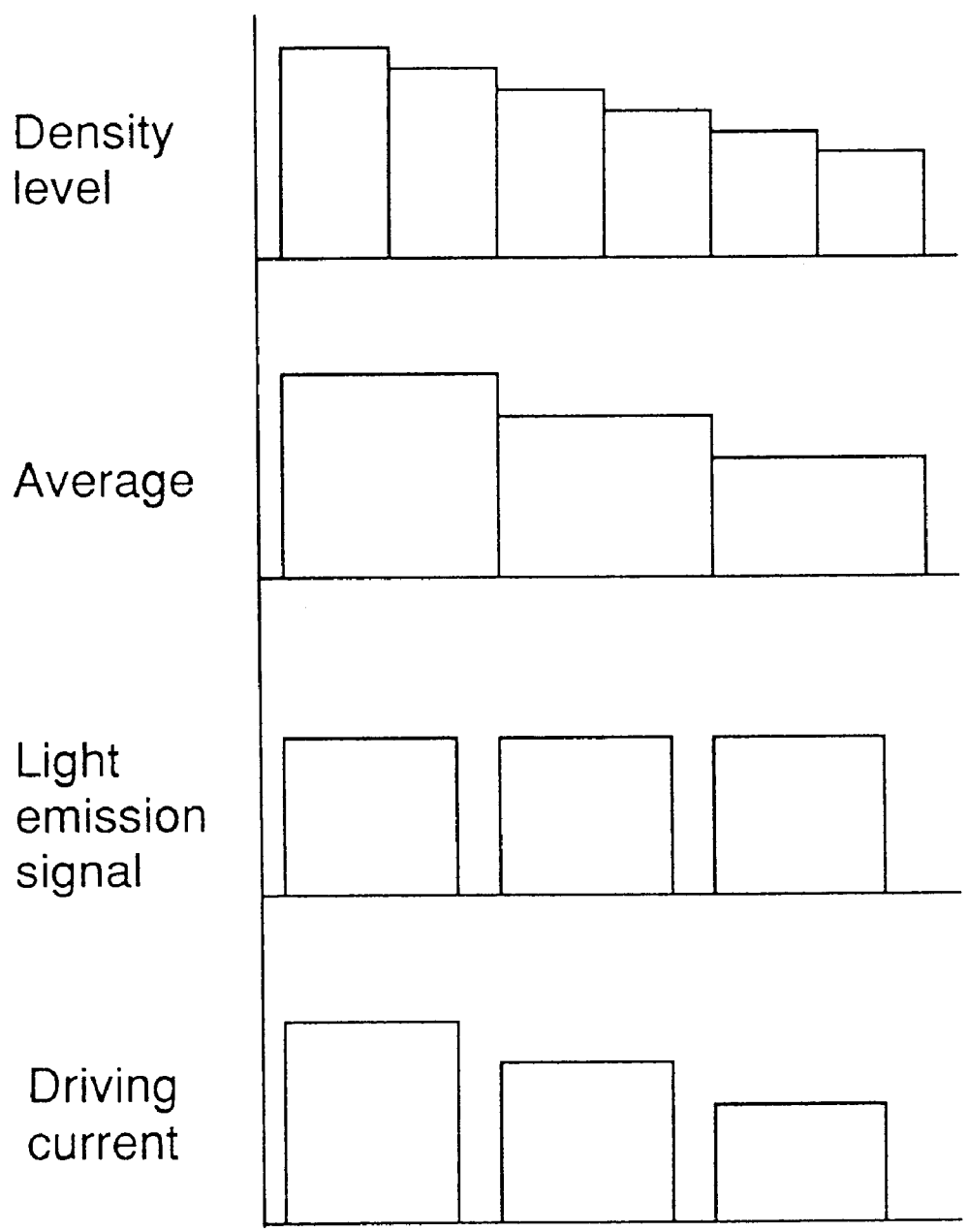
FIG. 13 is a timing chart of density level, average, light emission signal and driving current.

If the image type is discriminated as bi-level image, the duty ratio is set as 100%. On the other hand, if the image type is discriminated as multi-level image, the duty ratio is set between 70–95% depending on the environment factors. Then, the laser diode driver 87 generates a driving current for the laser diode 88 only when the light emission signal is received. FIG. 13 shows an example of duty ratio setting for sequential six pixels. As explained above, the gamma correction section 83 processes the correction in the unit of two pixels. That is, the density level data of two neighboring pixels are averaged, and the gradation correction is performed on the average. The light emission signal having a duty ratio is also handled in the unit of two dots for multi-level image. When density levels of sequential six pixels shown in FIG. 13 are received, averages thereof are calculated, and a driving current is generated by using a duty ratio of say 80% depending on the environment factors. The driving current is enhanced to compensate the decrease in duty ratio.

Figure 14:
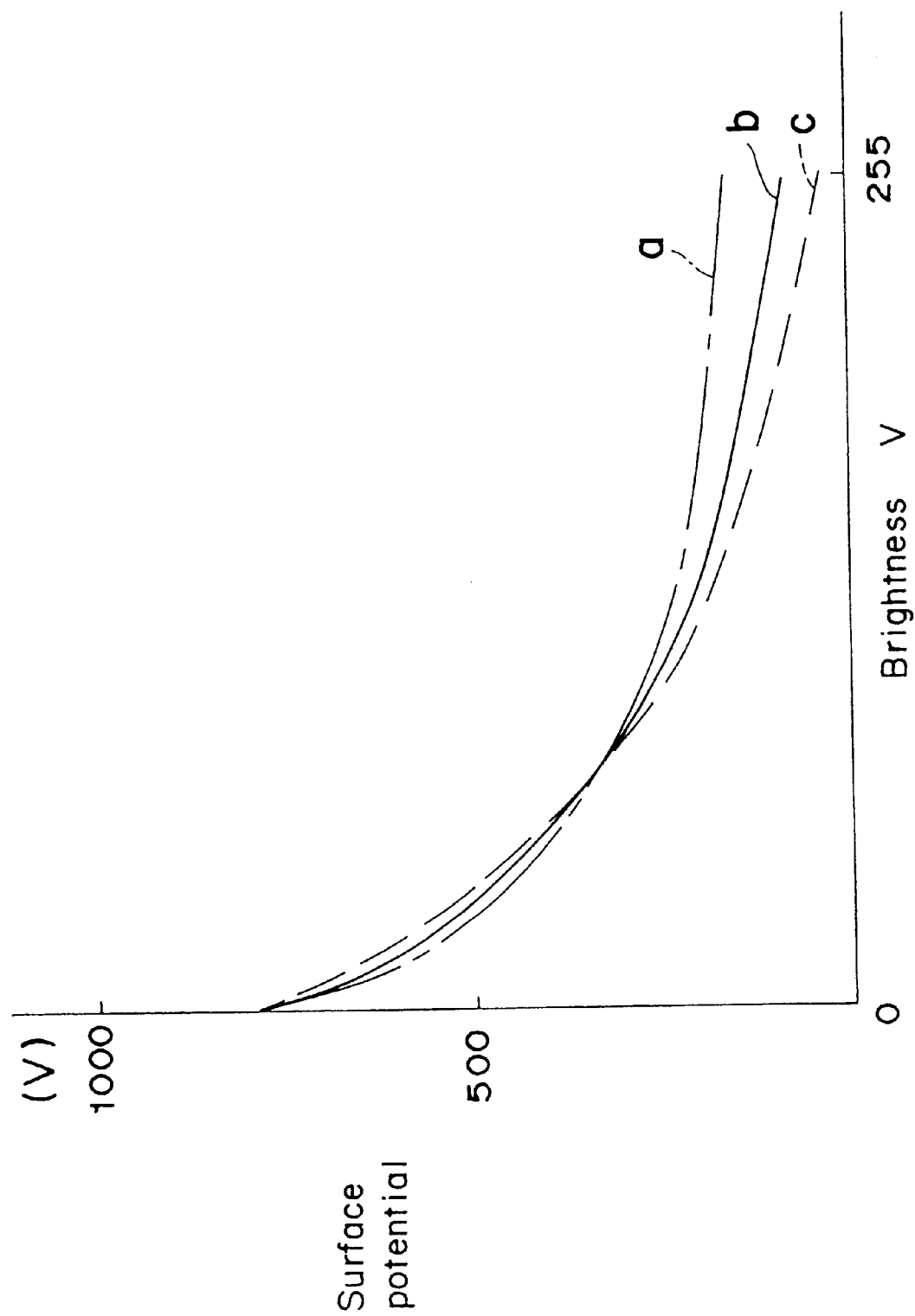
FIG. 14 is a graph of photoconductor characteristic in environments of (a) high temperature and high humidity, (b) room temperature and ordinary humidity, and (c) low temperature and low humidity.

Next, gradation correction determined by the printer controller 201 is explained. The sensitivity of the photoconductor for the exposure by the laser beam is affected by environment factors of humidity and temperature. FIG. 14 shows a photoconductor characteristic in environments of (a) high temperature and high humidity, (b) room temperature and intermediate humidity and (c) low temperature and low humidity. The sensitivity or the decrease in surface potential due to exposure at a brightness level decreases with decreasing humidity and with decreasing temperature.

Figure 15:
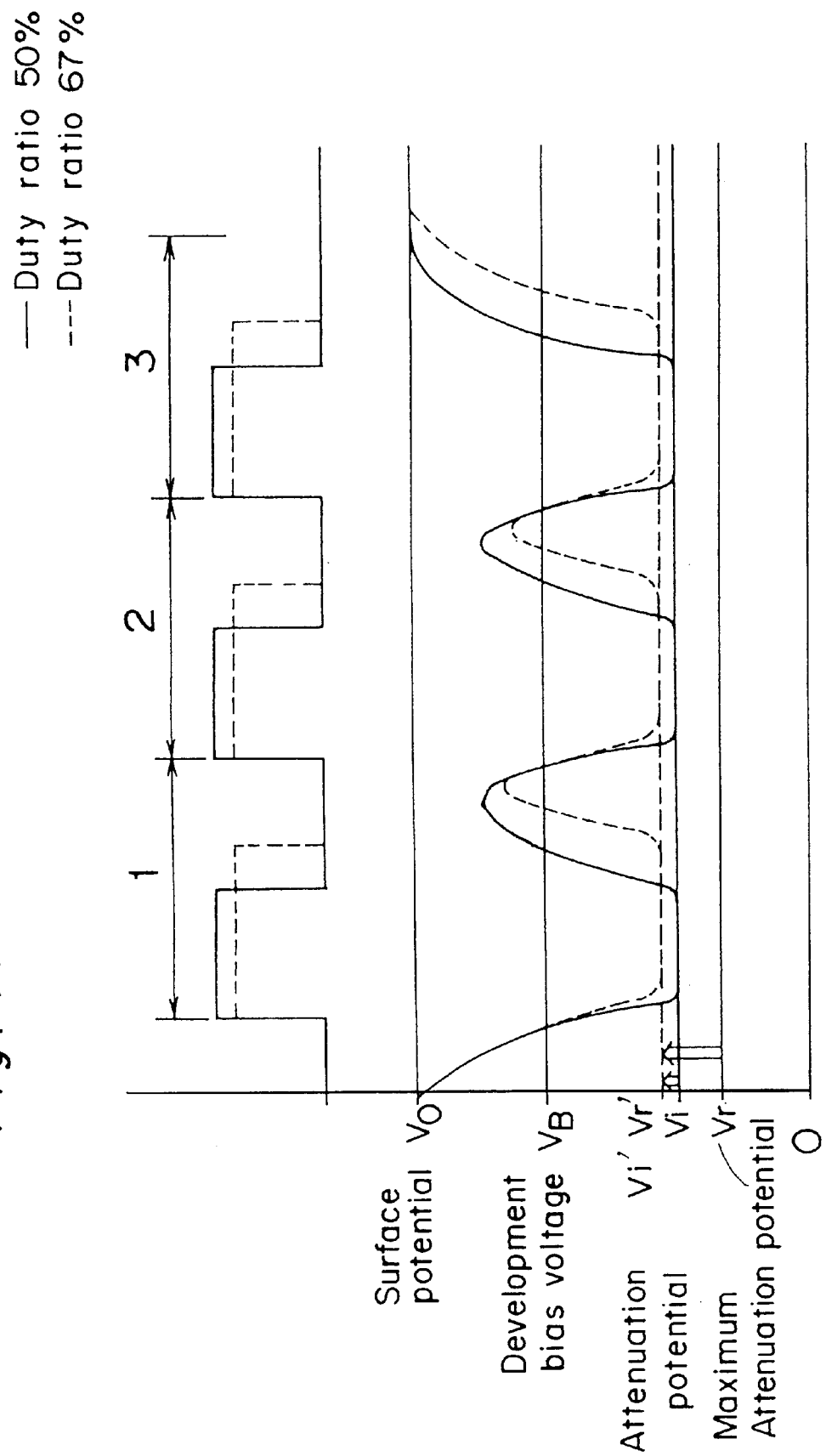
FIG. 15 is a graph of surface potential and a change in duty ratio.

FIG. 15 shows surface potential and an effect of duty ratio thereon. A rectangular wave shown at the top in FIG. 15 represents an intensity of exposure light on the photoconductor along the main scan direction for three dots. There are provided an interval between light-emitting periods. A solid line and a dashed line correspond to duty ratios of 50% and 67%, respectively, where duty ratio denotes a ratio of a light-emitting period to a sum of the light-emitting period and a non-light-emitting period. The intensity of the rectangular wave for duty ratio of 50% is higher than that for duty ratio of 67% in order to compensate the decrease in total quantity of exposure light per dot. The surface potential $V_o$ before exposure decreases to $V_i$ after exposure at the maximum density level. A maximum attenuation potential or residual potential $V_r$ represents a lowest surface potential caused by exposure. Toners adhere to portions where the surface potential $V_i$ is lower than the development bias voltage $V_B$ for the development unit 45a–45d.

The surface potential decreases exponentially with the density level or exposure intensity generally. Therefore, if the exposure intensity is increased when the sensitivity decreases, the attenuation characteristic can be maintained and the gradation curve is not changed. However, when the sensitivity decrease, the maximum attenuation potential $V_r$ increases or in FIG. 15 it increases from $V_r$ to $V_r'$. Therefore, the attenuation potential saturates before the intensity is increased to a maximum. Then, as shown in the curve "a" in an environment of high humidity and high temperature in FIG. 14, the surface potential does not decrease exponentially. Then, if the intensity is increased for correction, the attenuation becomes larger at highlight levels while it becomes smaller at high density levels, and this worsens the gradation characteristic. Then, in the example, the duty ratio is increased for from 50% to 67% while decreasing the intensity from say 1.00 mW to 0.80 mW, so that the attenuation potential at the maximum density level $V_i$ becomes lower than the maximum attenuation potential $V_r'$. In other words, the decrease in intensity of laser power is compensated by increasing duty ratio. Thus, the photoconductor characteristic is kept the same even in bad environment.

If the discrimination signal S(X,Y) for a processing block $B_{X,Y}$ is equal to one or if the image type is discriminated as bi-level image, the printer controller 201 sets the light emitting period in the unit of a dot, the duty ratio of 100% and a standard laser output power of 1.00 mW, because the resolution is emphasized. On the other hand, if the discrimination signal S(X,Y) is equal to zero or if the image type is multi-level image, the printer controller 201 sets the light emitting period in the unit of two dots, and it also sets the duty ratio and the standard laser output power depending on environment factors such as humidity and temperature, as shown in Table 1 or 2. If the surface potential is measured instead of the humidity and temperature, the duty ratio and the standard laser output power are changed according to Table 3. For a multi-level image, in the gamma correction circuit 83, the density level data of two pixels are averaged, and the gradation correction is performed on the average.

TABLE 1

Duty ratio and standard laser output power in various humidity ranges

| Humidity range (% RH) | Duty ratio (%) | Standard laser output power (mW) |
| --- | --- | --- |
| 0–20 | 70 | 1.40 |
| 21–40 | 75 | 1.30 |
| 41–60 | 75 | 1.30 |
| 61–80 | 80 | 1.32 |
| 81–100 | 90 | 1.08 |

If temperature is also considered in addition to humidity around the photoconductor, duty ratio (%) and standard laser output power (mW) are set in correspondence to the humidity and temperature according to Table 2. For example, if the humidity is between 0 and 35% RH and the temperature is between 0 and 12° C., the duty ratio is set at 75% and the standard laser output power is set at 1.48 mW.

TABLE 2

Duty ratio (%) and standard laser output power (mW) depending on humidity (% RH) and temperature (° C.)

| | 0–35 (% RH) | 36–60 (% RH) | 61–80 (% RH) | 81–100 (% RH) |
| --- | --- | --- | --- | --- |
| 0–12 (° C.) | 75% (1.48 mW) | 75% (1.48 mW) | 80% (1.39 mW) | 90% (1.18 mW) |
| 12–19 (° C.) | 75% (1.39 mW) | 75% (1.39 mW) | 80% (1.30 mW) | 90% (1.18 mW) |
| 19–26 (° C.) | 75% (1.30 mW) | 75% (1.30 mW) | 80% (1.21 mW) | 90% (1.09 mW) |
| 26–33 (° C.) | 75% (1.21 mW) | 75% (1.21 mW) | 80% (1.12 mW) | 90% (1.00 mW) |
| 34–40 (° C.) | 75% (1.12 mW) | 75% (1.12 mW) | 80% (1.06 mW) | 90% (0.94%) |
| 40– (° C.) | 75% (1.03 mW) | 75% (1.03 mW) | 80% (1.00 mW) | 90% (0.88 mW) |

Further, the duty ratio and the standard laser output power may be determined by detecting the sensitivity change of the photoconductor and the maximum attenuation potential by measuring the surface potential on the photoconductor, without considering environment factors such as humidity and temperature. For example, a surface potential sensor 97 is provided near the photoconductor drum, as shown in FIG. 1, and the surface potential is measured when the photoconductor is irradiated with a laser beam of a prescribed intensity. Then, the duty ratio and the standard laser output power are determined according to the measured value.

Further, in order to improve the precision of setting the duty ratio and the standard laser output power, they may be determined according to Table 3 by measuring the surface potential on the photoconductor at a low density level and at a high density level. In Table 3, A(V) represents a surface potential of the photoconductor when the photoconductor is sensitized at 950 V and exposed at a lower laser output power of 0.15 mW, while B(V) represents a surface potential when the photoconductor is sensitized at 950 V and exposed at a higher laser output power of 1.50 mW.

TABLE 3

Duty ratio and standard laser output power

| A [v] | B [v] | | | | | | | |
|---|---|---|---|---|---|---|---|---|
| | 0~29 | 30~59 | 60~89 | 90~119 | 120~149 | 150~179 | 180~209 | 210~ |
| 650~669 | 60%(1.48 mW) | 65%(1.39 mW) | 70%(1.33 mW) | 75%(1.24 mW) | 80%(1.15 mW) | 85%(1.09 mW) | 90%(1.03 mW) | 100%(0.91 mW) |
| 670~689 | 60%(1.54 mW) | 65%(1.47 mW) | 70%(1.39 mW) | 75%(1.30 mW) | 80%(1.21 mW) | 85%(1.15 mW) | 90%(1.04 mW) | 100%(0.97 mW) |
| 690~709 | 60%(1.63 mW) | 65%(1.54 mW) | 70%(1.45 mW) | 75%(1.36 mW) | 80%(1.27 mW) | 85%(1.21 mW) | 90%(1.12 mW) | 100%(1.03 mW) |
| 710~729 | 60%(1.72 mW) | 65%(1.60 mW) | 70%(1.51 mW) | 75%(1.42 mW) | 80%(1.33 mW) | 85%(1.27 mW) | 90%(1.18 mW) | 100%(1.06 mW) |
| 730~749 | 65%(1.72 mW) | 65%(1.69 mW) | 70%(1.57 mW) | 75%(1.48 mW) | 80%(1.39 mW) | 85%(1.33 mW) | 90%(1.24 mW) | 100%(1.09 mW) |
| 750~769 | 65%(1.75 mW) | 65%(1.72 mW) | 70%(1.63 mW) | 75%(1.54 mW) | 80%(1.45 mW) | 85%(1.39 mW) | 90%(1.27 mW) | 100%(1.15 mW) |
| 770~789 | 70%(1.75 mW) | 70%(1.72 mW) | 70%(1.69 mW) | 75%(1.60 mW) | 80%(1.51 mW) | 85%(1.45 mW) | 90%(1.33 mW) | 95%(1.27 mW) |
| 790~809 | 70%(1.78 mW) | 70%(1.78 mW) | 70%(1.75 mW) | 75%(1.66 mW) | 80%(1.57 mW) | 85%(1.48 mW) | 85%(1.45 mW) | 95%(1.33 mW) |
| 810~829 | 75%(1.78 mW) | 75%(1.78 mW) | 75%(1.75 mW) | 75%(1.72 mW) | 80%(1.63 mW) | 85%(1.54 mW) | 85%(1.51 mW) | 90%(1.42 mW) |
| 830~850 | 80%(1.78 mW) | 80%(1.78 mW) | 89%(1.78 mW) | 75%(1.78 mW) | 80%(1.69 mW) | 80%(1.66 mW) | 85%(1.57 mW) | 80%(1.48 mW) |

NB: Duty ratio is represented in the unit of %, while the standard laser output power in parentheses is represented in the unit of mW.

As explained above, the digital copying machine discriminates a document image as a character image or a half-tone image. For a character image, the intensity of the laser beam is modulated with light emitting period of one dot and duty ratio of 100%, to form an image of high resolution. Then, an image of high resolution can be formed. For a half-tone image, the light emitting period and the duty ratio are changed according to environment. Then, an image of better image quality is formed by eliminating pitch noises along subscan direction, and the gradation characteristic is improved to form a better and stable image.

In the embodiment, document image types are classified into bi-level image and multi-level image. However, in a modified embodiment, the multi-level image is further classified into a photograph image and a dot image, and duty ratio may be changed between the photograph image and the dot image. For example, the duty ratio may be set as 80% for a photograph image and as 90% for a dot image, while it is set as 100% for a bi-level image.

In the embodiment, image type is discriminated simultaneously as an document image is read. However, image type may be discriminated by using document image data obtained in a prescan, and image data for printing may be read after the image discrimination is completed.

Further, the discrimination may be carried out on the entire image instead of discriminating image type for each processing block.

A histogram may be made only on image data of one color among red, green and blue. It is also possible to discriminate image type by using a sum of frequencies in ranges between 0 and 7, between 8 and 15, . . . , between 240 and 247 and between 248 and 255. It is also possible to use density data instead of brightness data for image discrimination In a modified example, the charge amount by the sensitizing charger 43 is corrected to an appropriate value by measuring the surface potential of the photoconductor at a portion not exposed before measuring the surface potential at a portion exposed at a predetermined intensity.

In a different example, the duty ratio and the standard laser output power are determined according to photosensitive characteristic of the photoconductor which is obtained by measuring the surface potential for portions illuminated at various intensities.

The duty ratio and the standard laser output power can be corrected better by taking into account both environment data and measured surface potentials.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital image forming apparatus comprising:
    an image sensor which receives light from an original image and outputs signals with respect to the original image;
    a photoconductor;
    an exposure means for exposing a surface of said photoconductor to light emitted from a light source so as to form an electrostatic latent image thereon;
    an exposure control means for controlling an intensity of the light of said exposure means according to the signals outputted by said image sensor;
    a light-emission control means for inhibiting said exposure means to expose said photoconductor every predetermined period so that a non-light-emitting time interval is formed between light-emitting periods wherein said exposure means exposes the surface of said photoconductor;
    a discriminating means for determining an image type of the original image; and
    a ratio changing means for changing a ratio of the light-emitting period to the interval in accordance to the image type determined by said discriminating means.

2. The digital image forming apparatus according to claim 1, wherein said discriminating means comprises a distribution detection means for detecting a distribution of image data for at least a portion of said original image.

3. The digital image forming apparatus according to claim 1, wherein said discriminating means comprises a distribution detection means for obtaining a frequency distribution on brightness data derived from the image data for at least a portion of said original image.

4. The digital image forming apparatus according to claim 1, wherein image types which can be determined by said discriminating means include a bi-level image and a multi-level image.

5. The digital image forming apparatus according to claim 1, wherein said discriminating means includes a distribution detection means which detects a distribution of image data for each of a plurality of regions of the original image and determines the image type for each of the plurality of regions.

6. The digital image forming apparatus according to claim 1, wherein said discriminating means determines an image type for each of a plurality of regions of the original image.

7. The digital image forming apparatus according to claim 1, wherein said ratio changing means increases the intensity of the light in accordance to the ratio.

8. The digital image forming apparatus according to claim 1, wherein said light-emission control means inhibits said exposure means to expose said photoconductor every predetermined period corresponding to a period for exposing a number of dots of image data, said number of dots being determined in accordance to the image type determined by said discriminating means.

9. The digital image forming apparatus according to claim 8, further comprising a memory for storing a table of a plurality of combinations of the number of the dots and the ratio related to the image type determined by said discriminating means.

10. The digital image forming apparatus according to claim 1, further comprising a detection means for detecting an environmental factor, wherein said discriminating means sets the ratio in accordance to the image type determined by said discriminating means and to the environmental factor detected by said detection means.

11. The digital image forming apparatus according to claim 10, wherein the environmental factor comprises humidity.

12. The digital image forming apparatus according to claim 1, further comprising a detector for detecting a surface potential of said photoconductor, wherein said discriminating means sets the ratio in accordance to the image type determined by said discriminating means and to the surface potential detected by said detector.

13. The digital image forming apparatus according to claim 12, wherein said detector detects the surface potentials in a plurality of predetermined exposure conditions.

14. The digital image forming apparatus according to claim 1, further comprising data means for providing image data according to the signals outputted by said image sensor; and wherein said discriminating means receives said image data from said data means and processes the thus received image data to determine an image type for the original image.

15. The digital image forming apparatus according to claim 14, wherein said discriminating means comprising a distribution detection means for detecting a distribution of the image data for at least a portion of the original image.

16. The digital image forming apparatus according to claim 14, wherein said discriminating means comprises a distribution detection means for obtaining a frequency distribution on brightness data derived from the image data for at least a portion of the original image.

17. The digital image forming apparatus according to claim 14, wherein said discriminating means includes a distribution detection means which detects a distribution of image data for each of a plurality of regions of the original image and determines an image type for each of the plurality of regions.

18. A digital image forming apparatus comprising:

an image reader which reads an original image and outputs signals according to the original image;

a photoconductor;

a scanner which scans a surface of said photoconductor with light so as to form an electrostatic latent image;

an exposure control means for controlling an intensity of the light generated by said scanner according to signals received from said image reader;

a designating means for determining an image type of the original image; and a light-emission control means for inhibiting said scanner to expose said photoconductor for a predetermined time period every time a predetermined number of dots of image data is exposed so that non-light emitting interval is formed between light-emitting periods when said designating means determines that the original image is a multi-level image.

19. The digital image forming apparatus according to claim 18, wherein said exposure control means decreases the intensity of the light when said designating means determines that the original image is a multi-level image.

20. The digital image forming apparatus according to claim 18, further comprising data means for providing image data according to the signals outputted by said image reader; and wherein said designating means receives said image data from said data means and processes the thus received image data to determine an image type of the original image.

21. A method for forming a digital image comprising the steps of:

receiving, with an image sensor, light from an original image and outputting signals with respect to the original image;

exposing a surface of a photoconductor with light emitted from a light source so as to form an electrostatic latent image on the surface of the photoconductor;

controlling an intensity of the light emitted from said light source according to the outputted signals;

inhibiting the exposing of the surface every predetermined period so that a non-light-emitting time interval is formed between light-emitting periods;

determining an image type of the original image; and changing a ratio of the light-emitting period to the interval in accordance to the image type determined in said step of determining.

* * * * *